(12) United States Patent
Zhu

(10) Patent No.: US 10,579,973 B2
(45) Date of Patent: Mar. 3, 2020

(54) SYSTEM FOR EFFICIENT PROCESSING OF TRANSACTION REQUESTS RELATED TO AN ACCOUNT IN A DATABASE

(71) Applicant: Alibaba Group Holding Limited, George Town, Grand Cayman (KY)

(72) Inventor: Chunmao Zhu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 418 days.

(21) Appl. No.: 14/997,331

(22) Filed: Jan. 15, 2016

(65) Prior Publication Data
US 2016/0210597 A1 Jul. 21, 2016

(30) Foreign Application Priority Data

Jan. 19, 2015 (CN) .......................... 2015 1 0025710

(51) Int. Cl.
*G06Q 20/10* (2012.01)
*G06Q 20/26* (2012.01)
*G06Q 20/32* (2012.01)

(52) U.S. Cl.
CPC ............. *G06Q 20/10* (2013.01); *G06Q 20/26* (2013.01); *G06Q 20/3221* (2013.01)

(58) Field of Classification Search
None
See application file for complete search history.

(56) References Cited

U.S. PATENT DOCUMENTS

| 4,281,391 A | 7/1981 | Huang |
| 6,526,166 B1 | 2/2003 | Gorman |
| 6,601,035 B1 * | 7/2003 | Panagos ................ G06Q 10/06 705/7.22 |

(Continued)

FOREIGN PATENT DOCUMENTS

| CN | 101383032 | 3/2009 |
| CN | 201498035 | 6/2010 |

(Continued)

OTHER PUBLICATIONS

Kanitkar et al., "Real-time processing in client-server databases", 2002, IEEE Transactions on Computers (vol. 51 , Issue: 3 , Mar. 2002), ¶¶ 1-4 of § 2.1 (Year: 2002).*

(Continued)

*Primary Examiner* — Abhishek Vyas
*Assistant Examiner* — Dario Bianco
(74) *Attorney, Agent, or Firm* — Shun Yao; Park, Vaughan, Fleming & Dowler LLP

(57) ABSTRACT

One embodiment provides a system that facilitates efficient processing of requests related to a database. During operation, the system receives, by a server, a request to transfer an amount in to an account of a user, wherein the account is visible to the user and corresponds to a record in a database. The system selects one of a plurality of shadow accounts that correspond to the account, wherein a shadow account is not visible to the user. The system locks the selected shadow account, which prevents any changes to be made to the corresponding record in the database. The system modifies a balance of the selected shadow account by adding the amount to be transferred in to a current balance of the selected shadow account.

28 Claims, 9 Drawing Sheets

(56) References Cited

U.S. PATENT DOCUMENTS

| | | | |
|---|---|---|---|
| 6,697,947 B1 | 2/2004 | Matyas, Jr. | |
| 6,725,448 B1 * | 4/2004 | Moriya | G06F 9/4843 717/119 |
| 6,726,094 B1 | 4/2004 | Rantze | |
| 7,149,720 B2 | 12/2006 | Shepherd | |
| 7,321,874 B2 | 1/2008 | Dilip | |
| 7,447,663 B1 | 11/2008 | Barker | |
| 7,617,157 B2 | 11/2009 | Seifert | |
| 7,636,679 B2 | 12/2009 | Song | |
| 7,734,527 B2 | 6/2010 | Uzo | |
| 7,809,636 B1 | 10/2010 | Jou | |
| 7,809,762 B1 | 10/2010 | Parker | |
| 7,877,297 B2 | 1/2011 | Gould | |
| 7,941,760 B2 | 5/2011 | Kocienda | |
| 7,946,474 B1 | 5/2011 | Agrawal | |
| 7,978,900 B2 | 7/2011 | Nepomniachtchi | |
| 8,090,642 B1 | 1/2012 | Van Doren | |
| 8,176,324 B1 | 5/2012 | Krishnamurthy | |
| 8,280,782 B1 | 10/2012 | Talreja | |
| 8,423,392 B2 | 4/2013 | Moxley | |
| 8,423,467 B1 | 4/2013 | Johansson | |
| 8,498,933 B1 * | 7/2013 | Bent | G06Q 20/10 705/35 |
| 8,645,295 B1 | 2/2014 | Dillard | |
| 9,111,073 B1 | 8/2015 | Jiang | |
| 9,239,722 B1 | 1/2016 | Calahan | |
| 9,621,348 B2 | 4/2017 | Bahjat | |
| 2002/0111916 A1 | 8/2002 | Coronna | |
| 2002/0156687 A1 | 10/2002 | Carr | |
| 2002/0161466 A1 | 10/2002 | Heching | |
| 2003/0042301 A1 | 3/2003 | Rajasekaran | |
| 2003/0061172 A1 | 3/2003 | Robinson | |
| 2003/0200190 A1 | 10/2003 | Adar | |
| 2004/0139008 A1 | 7/2004 | Mascavage | |
| 2004/0153407 A1 * | 8/2004 | Clubb | G06Q 20/105 705/41 |
| 2005/0038707 A1 | 2/2005 | Roever | |
| 2005/0071637 A1 | 3/2005 | Shirakawa | |
| 2005/0075954 A1 | 4/2005 | Matsumoto | |
| 2005/0113123 A1 | 5/2005 | Torvinen | |
| 2005/0144406 A1 * | 6/2005 | Chong, Jr. | G06F 11/1466 711/162 |
| 2005/0170856 A1 | 8/2005 | Keyani | |
| 2005/0240935 A1 | 10/2005 | Ramanathan | |
| 2006/0010190 A1 | 1/2006 | Shimbo | |
| 2006/0056626 A1 | 3/2006 | Keohane | |
| 2006/0069635 A1 | 3/2006 | Ram | |
| 2006/0089897 A1 | 4/2006 | Maas | |
| 2006/0176847 A1 | 8/2006 | Chen | |
| 2006/0220842 A1 | 10/2006 | Breed | |
| 2006/0271783 A1 | 11/2006 | Wong | |
| 2007/0035617 A1 | 2/2007 | Ko | |
| 2007/0043651 A1 | 2/2007 | Xiao | |
| 2007/0276730 A1 | 11/2007 | Lee | |
| 2008/0004981 A1 | 1/2008 | Gopalpur | |
| 2008/0077542 A1 | 3/2008 | McElhiney | |
| 2008/0097805 A1 | 4/2008 | Wells | |
| 2008/0119160 A1 | 5/2008 | Andriantsiferana | |
| 2008/0120160 A1 | 5/2008 | Woo | |
| 2008/0182586 A1 | 7/2008 | Aaron | |
| 2008/0228595 A1 | 9/2008 | Hill | |
| 2008/0306839 A1 | 12/2008 | Starrs | |
| 2009/0076926 A1 | 3/2009 | Zinberg | |
| 2009/0090772 A1 | 4/2009 | Lee | |
| 2009/0094275 A1 | 4/2009 | Patton | |
| 2009/0106825 A1 | 4/2009 | Cerruti | |
| 2009/0144451 A1 | 6/2009 | Cabezas | |
| 2009/0157522 A1 | 6/2009 | Srinivasan | |
| 2009/0195506 A1 | 8/2009 | Geidl | |
| 2010/0042600 A1 | 2/2010 | Orr | |
| 2010/0060585 A1 | 3/2010 | Chiu | |
| 2010/0073302 A1 | 3/2010 | Ritzau | |
| 2010/0088026 A1 | 4/2010 | Manolescu | |
| 2010/0162036 A1 | 6/2010 | Linden | |
| 2010/0191648 A1 | 7/2010 | Smith | |
| 2010/0210240 A1 | 8/2010 | Mahaffey | |
| 2010/0223543 A1 | 9/2010 | Marston | |
| 2010/0235283 A1 | 9/2010 | Gerson | |
| 2010/0241575 A1 | 9/2010 | Cotton | |
| 2010/0250436 A1 | 9/2010 | Loevenguth | |
| 2011/0016520 A1 | 1/2011 | Cohen | |
| 2011/0093493 A1 | 4/2011 | Nair | |
| 2011/0125616 A1 | 5/2011 | Ni | |
| 2011/0125667 A1 | 5/2011 | Faludi | |
| 2011/0184840 A1 | 7/2011 | Godard | |
| 2011/0231465 A1 | 9/2011 | Phatak | |
| 2011/0258027 A1 | 10/2011 | Lee | |
| 2011/0264598 A1 | 10/2011 | Fuxman | |
| 2012/0016799 A1 | 1/2012 | Killian | |
| 2012/0076283 A1 | 3/2012 | Ajmera | |
| 2012/0101942 A1 | 4/2012 | Park | |
| 2012/0117271 A1 | 5/2012 | Kennedy | |
| 2012/0143924 A1 | 6/2012 | Sethi | |
| 2012/0158467 A1 | 6/2012 | Hammad | |
| 2012/0198228 A1 | 8/2012 | Oberheide | |
| 2012/0204256 A1 | 8/2012 | Craine | |
| 2012/0259774 A1 | 10/2012 | Marti | |
| 2012/0259783 A1 | 10/2012 | Kemper | |
| 2012/0284776 A1 | 11/2012 | Sundaram | |
| 2012/0299831 A1 | 11/2012 | Lioy | |
| 2012/0323846 A1 | 12/2012 | Bai | |
| 2013/0066889 A1 | 3/2013 | Rodriguez | |
| 2013/0067055 A1 | 3/2013 | Cheng | |
| 2013/0094751 A1 | 4/2013 | Nepomniachtchi | |
| 2013/0110670 A1 | 5/2013 | Webber | |
| 2013/0232071 A1 | 9/2013 | Dilip | |
| 2013/0246172 A1 | 9/2013 | Moissinac | |
| 2013/0311532 A1 | 11/2013 | Olsen | |
| 2013/0317895 A1 | 11/2013 | Turner | |
| 2013/0331130 A1 | 12/2013 | Lee | |
| 2014/0037184 A1 | 2/2014 | Gorski | |
| 2014/0052636 A1 | 2/2014 | Mattes | |
| 2014/0156512 A1 | 6/2014 | Rahman | |
| 2014/0162698 A1 | 6/2014 | Han | |
| 2014/0164109 A1 | 6/2014 | Chow | |
| 2014/0173755 A1 | 6/2014 | Wahl | |
| 2014/0236801 A1 | 8/2014 | Hansen | |
| 2014/0279525 A1 | 9/2014 | Mohsenzadeh | |
| 2014/0280910 A1 | 9/2014 | Swig | |
| 2014/0306896 A1 | 10/2014 | Sosby | |
| 2014/0310133 A1 | 10/2014 | Bednar | |
| 2014/0310171 A1 | 10/2014 | Grossman | |
| 2015/0066679 A1 | 3/2015 | Mack | |
| 2015/0186989 A1 | 7/2015 | Kneen | |
| 2015/0220876 A1 | 8/2015 | Sethi | |
| 2015/0235477 A1 | 8/2015 | Simkin | |
| 2015/0356288 A1 | 12/2015 | Guo | |
| 2015/0379460 A1 | 12/2015 | Zamer | |
| 2015/0381629 A1 | 12/2015 | O'Sullivan | |
| 2016/0004857 A1 | 1/2016 | Chen | |
| 2016/0012503 A1 | 1/2016 | Fu | |
| 2016/0077734 A1 | 3/2016 | Buxton | |
| 2017/0270598 A1 | 9/2017 | Ram | |

FOREIGN PATENT DOCUMENTS

| | | | |
|---|---|---|---|
| DE | 102004047258 | 4/2006 | |
| EP | 0992949 | 4/2000 | |
| EP | 1067471 | 1/2001 | |
| GB | 2378787 A * | 2/2003 | H04L 67/32 |
| JP | 2013235605 | 11/2013 | |
| JP | 201441614 | 6/2014 | |
| KR | 20020057906 | 7/2002 | |
| WO | 2012045128 | 4/2012 | |
| WO | 2013003372 | 1/2013 | |

(56) References Cited

FOREIGN PATENT DOCUMENTS

| WO | 2013149883 | 10/2013 |
| WO | 2017080768 | 5/2017 |

OTHER PUBLICATIONS

Finzgar, Use of NFC and QR code identification in an electronic ticket system for public transpot, Sep. 15-17, 2011, IEEE, Nov. 1, 2011 (Year: 2011).

* cited by examiner

SYSTEM FOR EFFICIENT PROCESSING OF TRANSACTION REQUESTS RELATED TO AN ACCOUNT IN A DATABASE

RELATED APPLICATION

Under 35 U.S.C. 119, this application claims the benefit and right of priority of Chinese Patent Application No. 201510025710.4, filed 19 Jan. 2015.

BACKGROUND

Field

This disclosure is generally related to databases. More specifically, this disclosure is related to a system for efficiently processing transactions requests to transfer funds to or from an account in a database.

Related Art

The progress of technology brings both an increasing convenience and risk to financial transactions. An accounting database can include information for multiple accounts, where funds may be transferred to and from an account by locking a corresponding record in the database. For example, a transaction request (e.g., to transfer funds into an account or to transfer funds out of an account) may include two main operations: generating a record of the request; and updating the balance on the account. To preserve the accuracy of the database while performing these operations, the record corresponding to the account may be locked upon receiving a transaction request, and may be automatically unlocked upon completion of the transaction request. The database may receive multiple transactions requests for one account at the same time. However, only one request or "thread" may hold the lock for the account at any given time. Other requests or threads must wait to obtain the lock, and the database can only perform the transaction requests on the account in a sequential manner. Thus, the account may become a "hotspot" account that creates a performance bottleneck for the database.

SUMMARY

One embodiment provides a system that facilitates efficient processing of requests related to a database. During operation, the system receives, by a server, a request to transfer an amount in to an account of a user, wherein the account is visible to the user and corresponds to a record in a database. The system selects one of a plurality of shadow accounts that correspond to the account, wherein a shadow account is not visible to the user. The system locks the selected shadow account, which prevents any changes to be made to the corresponding record in the database. The system modifies a balance of the selected shadow account by adding the amount to be transferred in to a current balance of the selected shadow account.

In some embodiments, the database includes a mapping between the account and the plurality of corresponding shadow accounts.

In some embodiments, the system generates a record of the request that indicates the account, the selected shadow account, and the amount.

In some embodiments, the system unlocks the selected shadow account.

In another embodiment, the system receives, by a server, a request to transfer an amount out of an account of a user, wherein the account is visible to the user and corresponds to a record in a database. The system selects one of a plurality of shadow accounts that correspond to the account, wherein a shadow account is not visible to the user. The system locks the selected shadow account, which prevents any changes to be made to the corresponding record in the database. In response to determining that a balance of the selected shadow account is less than the amount to be transferred out, the system does the following: sets a balance of the account to a combined balance of the plurality of shadow accounts; sets a balance of each shadow account to zero; executes the request on the selected shadow account or on the account; and distributes a first amount equal to the balance of the account from the account to the plurality of shadow accounts.

In some embodiments, in executing the request on the selected shadow account or on the account, the system unlocks the selected shadow account, locks the account, and modifies the balance on the account by subtracting the amount from a current balance of the account.

In some embodiments, in executing the request on the selected shadow account or on the account, the system transfers a designated amount from the account to the selected shadow account, wherein the designated amount is of a value greater than or equal to the amount to be transferred out, and modifies the balance on the selected shadow account by subtracting the amount from a current balance of the selected shadow account.

In some embodiments, in response to determining that a balance of the selected shadow account is not less than the amount to be transferred out, the system modifies the balance on the selected shadow account by subtracting the amount from a current balance of the selected shadow account.

In some embodiments, distributing the first amount is based on one or more of: a random distribution of the first amount from the account to the plurality of shadow accounts; an equal distribution of the first amount from the account to the plurality of shadow accounts, wherein an amount distributed into each of the shadow account is based on an average of the first amount divided by the number of shadow accounts; and a predetermined rule for distributing the first amount from the account to the plurality of shadow accounts.

In some embodiments, the database includes one or more of: an account number that corresponds to the account; a balance that indicates a current balance of the account; an account creation time that indicates when the account was created; an account modification time that indicates when the account was last modified; and a flag that indicates if the account is a shadow account.

In another embodiment, the system receives, by a server, a request to transfer an amount out of an account of a user, wherein the account is visible to the user and corresponds to a record in a database. In response to identifying no shadow accounts with a balance greater than or equal to the amount to be transferred, wherein a shadow account is not visible to the user, the system performs the following operations: sets a balance of the account to a combined balance of the plurality of shadow accounts; sets a balance of each shadow account to zero; executes the request on a selected shadow account or on the account; and distributes a first amount equal to the balance of the account from the account to the plurality of shadow accounts.

In some embodiments, in executing the request on a selected shadow account or on the account, the system locks the account and modifies the balance on the account by subtracting the amount from a current balance of the account.

In some embodiments, in executing the request on a selected shadow account or on the account, the system selects one of the plurality of shadow accounts that correspond to the account. The system transfers a designated amount from the account to the selected shadow account, wherein the designated amount is of a value greater than or equal to the amount to be transferred out. The system modifies the balance on the selected shadow account by subtracting the amount from a current balance of the selected shadow account.

In some embodiments, the system generates a record of the request that indicates one or more of the account, the selected shadow account, and the amount.

In some embodiments, in response to identifying one or more shadow accounts with a balance greater than or equal to the amount to be transferred out, wherein a shadow account is not visible to the user, the system performs the following operations: selects one of the identified shadow accounts; locks the selected shadow account, which prevents any changes to be made to the corresponding record in the database; and modifies the balance on the selected shadow account by subtracting the amount from a current balance of the selected shadow account.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of a performance bottleneck in a database created by a user account that receives multiple concurrent transaction requests, where each request can only be completed sequentially by obtaining and releasing the same single lock for the account. The database can hold records corresponding to multiple user accounts, and a user can perform a transaction request on an account via a web, mobile, or other computing interface or device. A transaction request can include a request to transfer funds into a user account or out of a user account. Processing such a request accurately requires locking and unlocking an account (e.g., locking a row corresponding to the user account in the database) so that each transaction request may be performed atomically on the account during the time that the request or "thread" holds the lock.

As both the number of accounts and the number of transaction requests on an account increase, the database may receive an increased number of concurrent transaction requests on a given account. However, only one of the multiple concurrent requests may hold the lock for the account at any given time. As a result, the high volume of locking and unlocking operations executed on the account may lead to a "hotspot" in the database. The hotspot may create a performance bottleneck and lead to decreased efficiency for the database. The present system addresses these issues by creating a plurality of shadow accounts for each account, where a shadow account is not visible to the user. The system determines an optimal number of shadow accounts for a given account and distributes the balance of the account to the shadow accounts. The system can subsequently process a transaction request for the account by selecting one of the corresponding shadow accounts, and locking only the selected shadow account. This allows the system to continue processing transaction requests related to the same account, as only the one selected shadow account is locked, while the account itself remains unlocked.

Exemplary Network and Environment

Figure 1:
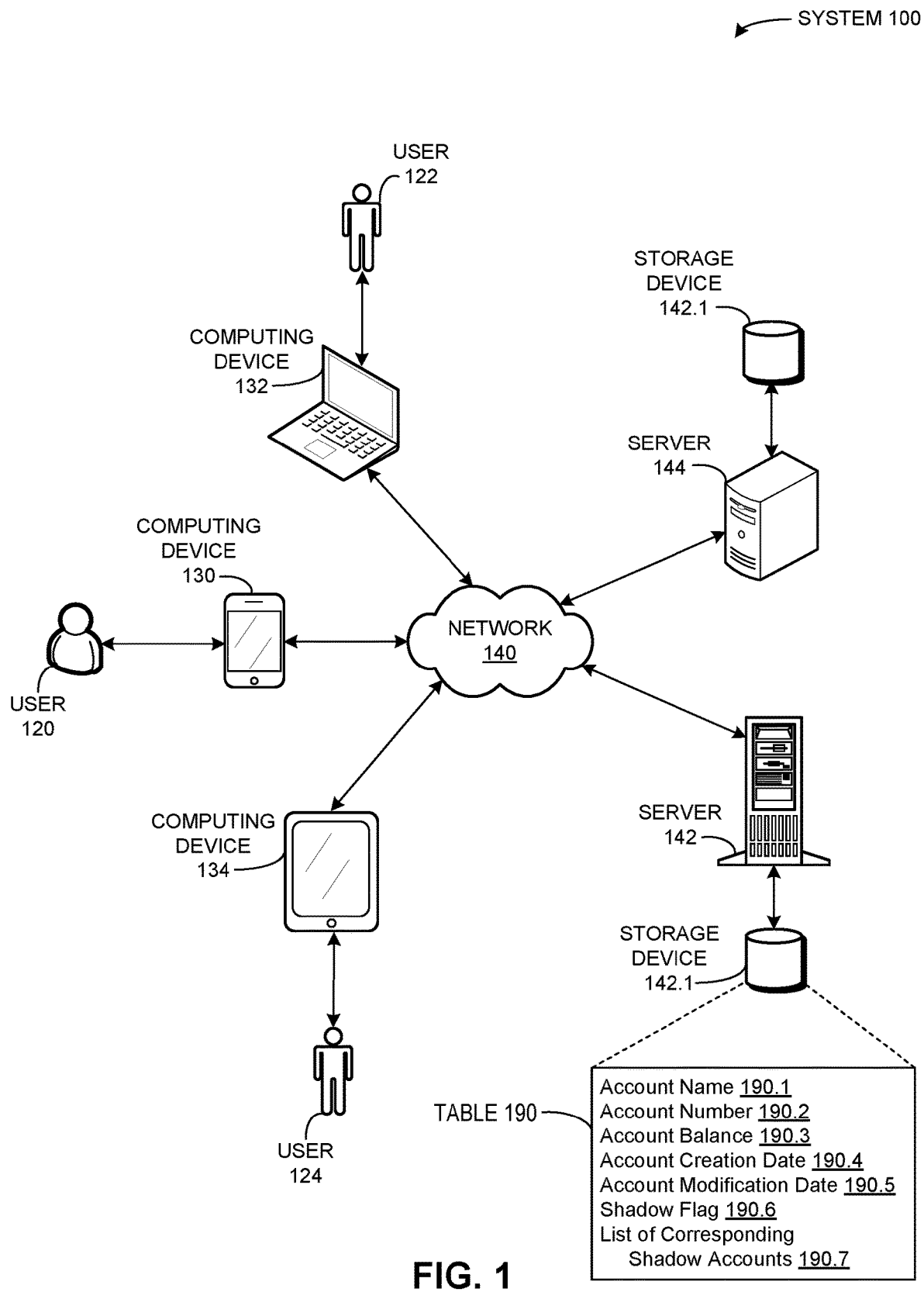
FIG. 1 illustrates an exemplary computing system that facilitates efficient processing of requests related to an account in a database, in accordance with an embodiment of the present application.

FIG. 1 illustrates an exemplary computing system that facilitates efficient processing of requests related to an account in a database, in accordance with an embodiment of the present application. In this example, system 100 can include computing devices 130, 132, and 134, which are associated with users 120, 122, and 124, respectively. Computing devices 130-134 can include, for example, a tablet, a mobile phone, an electronic reader, a laptop computer, a desktop computer, or any other computing device. Computing devices 130-134 can communicate with servers 142 and 144 via a network 140. Server 142 can communicate with a storage device 142.1, and server 144 can communicate with a storage device 144.1. In some embodiments, storage devices 142.1 and 144.1 reside, respectively, on servers 142 and 144. Storage device 142.1 can store a table 190, which can include multiple entries, each of which is related to an account. For example, table 190 can include an entry for an account that includes the following: an account name 190.1 that indicates a user-defined or system-defined name for the account; an account number 190.2 that indicates the number for the account; an account balance 190.3 that indicates the current balance for the account; an account creation date 190.4 that indicates the time and date that the account is created; an account modification time 190.5 that indicates the most recent time that the account is modified; a shadow flag 190.6 that indicates whether the account is a shadow account; and a list of corresponding shadow accounts 190.7 that indicates plurality of shadow accounts that are not visible to a user, where each shadow account is identified in list 190.7 by an account number or name for the shadow account and a creation date for the shadow account. Note that the entry described in table 190 can also pertain to a shadow account, in which case shadow flag 190.6 is set to indicate that the account is a shadow account, and list of corresponding shadow accounts 190.7 is set to null.

Thus, system 100 depicts a system that facilitates efficient processing of requests to transfer funds into and out of an account in a database. The system provides a method to distribute transaction requests relating to a single user account by creating a set of corresponding shadow accounts for each user account, and performing the functionality described herein.

Establishing a System to Efficiently Process Requests on an Account

Figure 2:
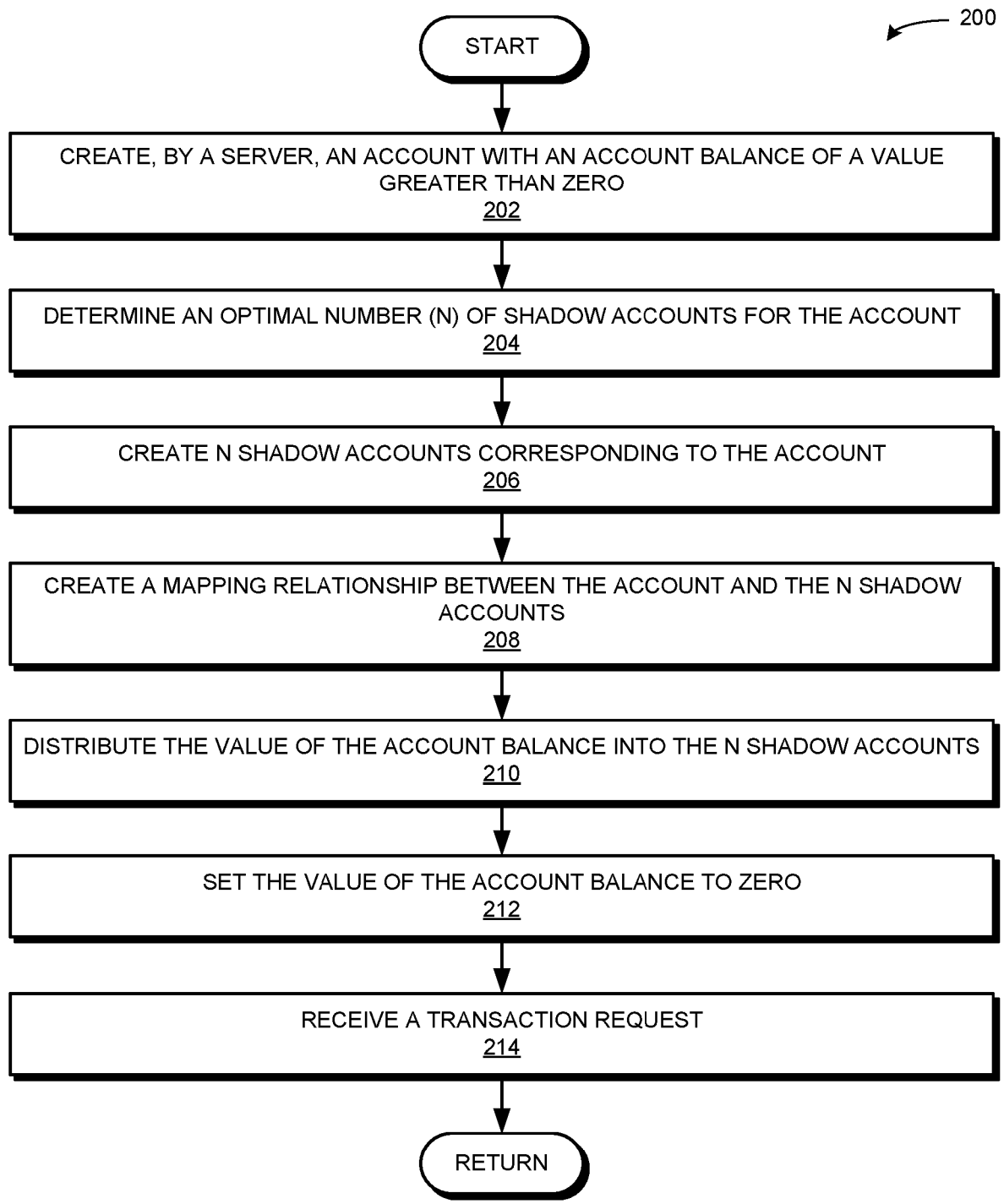
FIG. 2 presents a flowchart illustrating a method by a server for efficiently processing requests related to an account in a database, in accordance with an embodiment of the present application.

FIG. 2 presents a flowchart 200 illustrating a method by a server for efficiently processing requests related to an account in a database, in accordance with an embodiment of the present application, During operation, the system creates, by a server, an account with an account balance of a value greater than zero (operation 202). The system determines an optimal number ("N") of shadow accounts for the account (operation 204). A shadow account is a "secondary" account that corresponds to an account, and is not visible to a user. A shadow account may contain the same structure as an account, as described above in relation to table 190 of FIG. 1. The greater the number of shadow accounts, the better the reduction of "hotspot" accounts in a database. However, increasing the number of shadow accounts may result in performance issues due to additional space and resource consumption. Thus, the system can determine the optimal number N of shadow accounts corresponding to an account based on a balanced consideration and analysis of hotspot reduction and resource consumption. For example, the system can identify a hotspot based on the amount of time spent to complete a transaction request on an account, or based on a large number of failure messages associated with an account (e.g., a "Failure to acquire database lock" message). These characteristics may be logged in a system log. The system can analyze the logs over a certain period of time, gradually increase the number of shadow accounts, and continue analyzing the system logs to determine the optimal number N of shadow accounts. The analysis can include detecting that no related error report is generated in the system log, or that the amount of time spent to complete a transaction request on the account falls within a predetermined acceptable range.

Upon determining the optimal number N of shadow accounts, the system can create N shadow accounts corresponding to the account (operation 206). The system can create a mapping relationship between the account and the N shadow accounts (operation 208) (e.g., list of corresponding shadow accounts 190.7 as depicted and described in relation to table 190 of FIG. 1). The system can subsequently distribute the value of the account balance into the N shadow accounts (operation 210). This distribution can be performed based on several methods. A first method is a random distribution, where the account balance is randomly divided into N parts, and allocated to the N shadow accounts. A second method is average distribution, where the account balance ("M") is divided equally into N parts, and the average amount of M divided by N is allocated to the N shadow accounts. A third method can be based on one or more predetermined rules which determine the amount to be allocated to each of the N shadow accounts. The system sets the value of the account balance to zero (operation 212), and can subsequently receive a transaction request (operation 214). A transaction request can include a request to transfer funds into an account, or a request to transfer funds out of an account. Processing a transaction request is described below in relation to FIGS. 3, 4A-4B, and 5A-5B.

In addition, upon creating the N shadow accounts and distributing the balance of the account to the N shadow accounts, the system may receive a query for the balance of the account. In order to determine the balance of the account, the system can combine or aggregate the balance from each of the N shadow accounts (without transferring any amounts).

Efficiently Processing a Request to Transfer Funds into an Account

Figure 3:
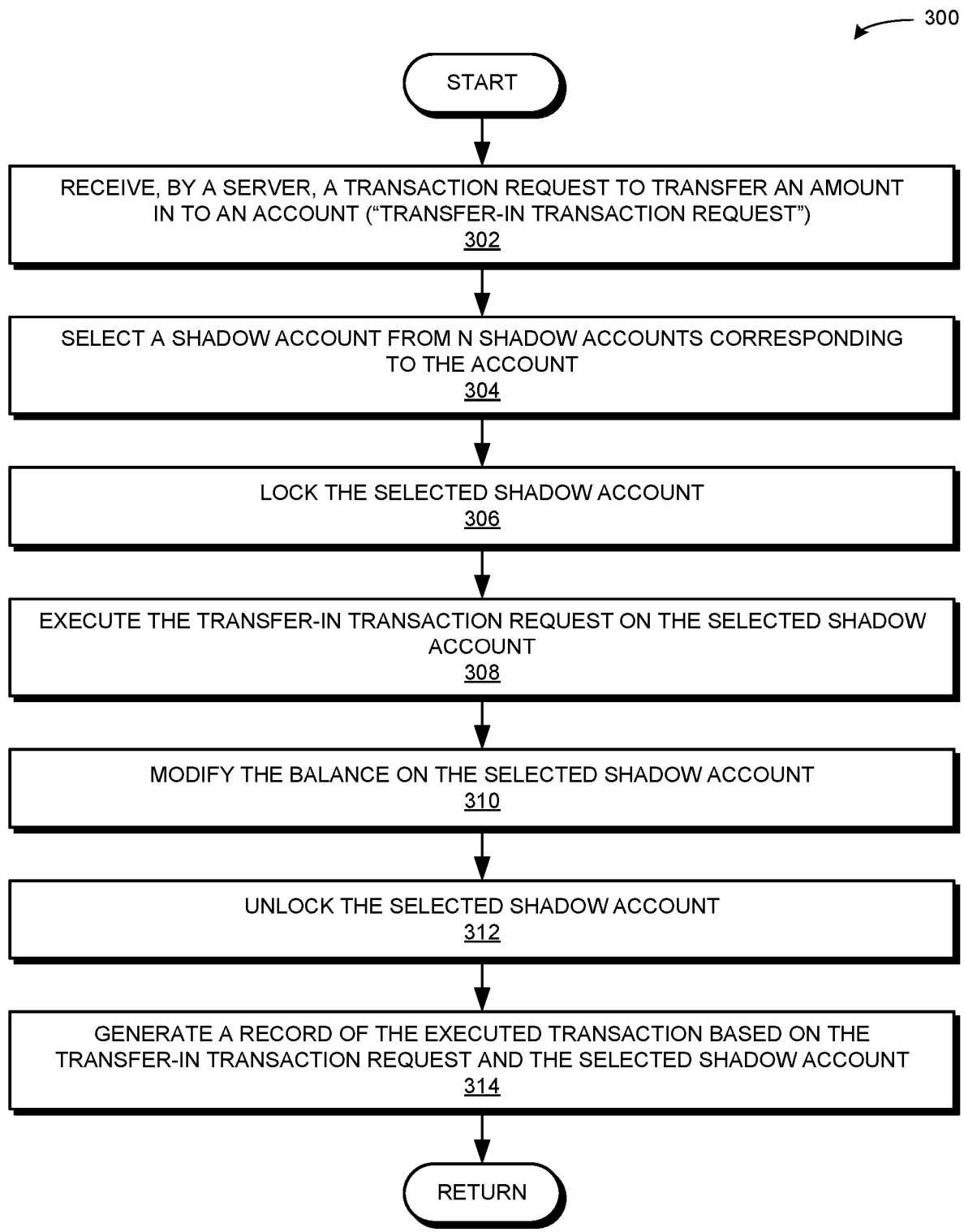
FIG. 3 presents a flowchart illustrating a method by a server for efficiently processing a request to transfer funds into an account in a database, in accordance with an embodiment of the present application.

FIG. 3 presents a flowchart 300 illustrating a method by a server for efficiently processing a request to transfer funds into an account in a database, in accordance with an embodiment of the present application. During operation, the system receives, by a server, a transaction request to transfer an amount into an account ("transfer-in transaction request") (operation 302), The system selects a shadow account from N shadow accounts corresponding to the account (operation 304). The system may select the shadow account randomly or based on a predetermined rule. For example, the system can order the N shadow accounts based on the value of their balance, and select the shadow account with the smallest balance. The system locks the selected shadow account (operation 306) and executes the transfer-in transaction request on the selected shadow account (operation 308). The system modifies the balance on the selected shadow account by adding the amount to be transferred in to a current balance of the selected shadow account (operation 310). Upon completion of the modification of the balance, the system can automatically unlock the selected shadow account (operation 312). The system then generates a record of the executed transaction based on the transfer-in transaction request and the selected shadow account (operation 314). For example, the generated record can indicate the account, the selected shadow account, the type of transaction request, the name or number of the shadow account, the time of completion of the transfer-in transaction request, and the amount involved in the transaction request.

Efficiently Processing a Request to Transfer Funds Out of an Account

Figure 4A:
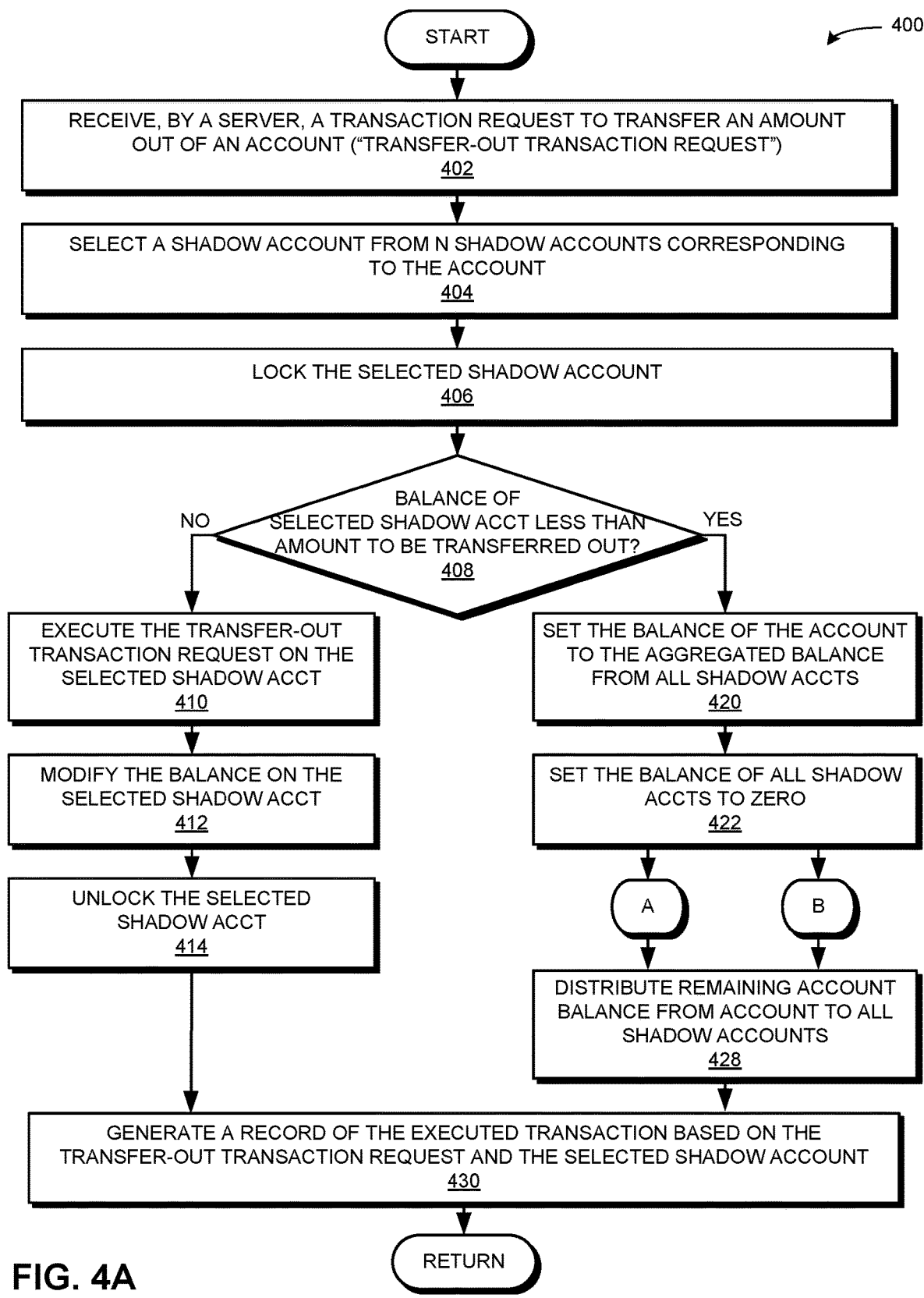
FIG. 4A presents a flowchart illustrating a method by a server for efficiently processing a request to transfer funds out of an account in a database, in accordance with an embodiment of the present application.

FIG. 4A presents a flowchart 400 illustrating a method by a server for efficiently processing a request to transfer funds out of an account in a database, in accordance with an embodiment of the present application. During operation, the system receives, by a server, a transaction request to transfer an amount out of an account ("transfer-out transaction request") (operation 402), The system selects a shadow account from N shadow accounts corresponding to the account (operation 404). As described above, the system may select the shadow account randomly or based on a predetermined rule (e.g., as described below in relation to operations 504-510 of FIG. 5A). The system locks the selected shadow account (operation 406). The system then determines whether the balance of the selected shadow account is less than the amount to be transferred out (decision 408). If it is not, the system executes the transfer-out transaction request on the selected shadow account (operation 410) and modifies the balance on the selected shadow account by subtracting the amount form a current balance of the selected shadow account (operation 412). Upon completion of the modification of the balance, the system can automatically unlock the selected shadow account (operation 414). The system then generates a record of the executed transaction based on the transfer-out transaction request and the selected shadow account (operation 430).

If the balance of the selected shadow account is less than the amount to be transferred out, the system sets the balance of the account to the aggregated balance from the N shadow accounts (operation 420), and sets the balance of each of the N shadow accounts to zero (operation 422). In other words, the system adds or combines the balance from each of the N shadow accounts, moves the combined balance to the account, and resets the balance on each of the N shadow accounts to zero. At this point, the operation can continue as described at Label A or Label B of FIG. 4B.

Figure 4B:
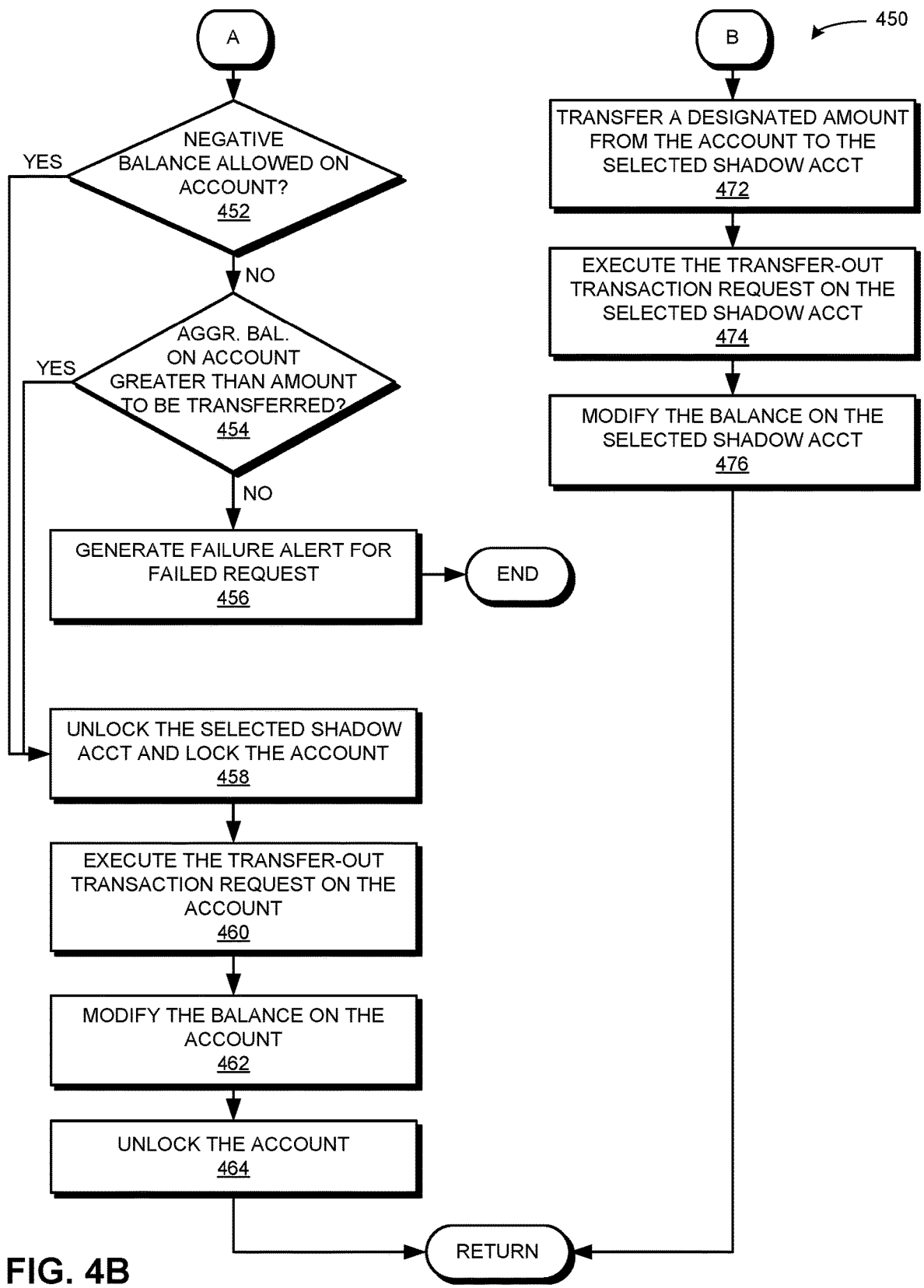
FIG. 4B presents a flowchart illustrating a method by a server for efficiently processing a request to transfer funds out of an account in a database, in accordance with an embodiment of the present application.

FIG. 4B presents a flowchart 450 illustrating a method by a server for efficiently processing a request to transfer funds out of an account in a database, in accordance with an embodiment of the present application. Label A depicts an operation performed on the account, while Label B depicts an operation performed on the selected shadow account. Under Label A, the system can determine whether a negative balance is allowed on the account (decision 452). If a negative balance is not allowed on the account, the system determines whether the aggregated balance on the account is greater than the amount to be transferred out (decision 454). If it is not, the transaction request fails and the system generates a failure alert (operation 456), and the operation ends. If the aggregated balance is greater than the amount to be transferred out, the system can proceed with operation 458. If a negative balance is allowed on the account (decision 452), the system can unlock the selected shadow account and lock the account (operation 458). The system can execute the transfer-out transaction request on the account (operation 460), modify the balance on the account by subtracting the amount to be transferred out from the current balance of the account (operation 462), and unlock the account (operation 464). The operation then continues as described in relation to FIG. 4A, operation 428. In some embodiments, upon setting the balance of all the shadow accounts to zero, the system automatically unlocks the account and the shadow accounts. The system can also maintain the lock on the account and the shadow accounts so that the account does not need to be locked again.

Under Label B, the system can transfer a designated amount from the account to the selected shadow account (operation 472). The designated amount can be of a value greater than or equal to the amount to be transferred out, and can be determined by the system based on a predetermined rule. For example, the designated amount can be an amount that leaves a predetermined margin, amount, or percentage upon completion of the transfer-out request. The system can execute the transfer-out transaction request on the selected shadow account (operation 474), and modify the balance on the selected shadow account by subtracting the amount from a current balance of the selected shadow account (operation 476). The operation then continues as described in relation to FIG. 4A, operation 428.

Upon completing the operations described above in relation to FIG. 4B, the system distributes the balance of the account from the account to the N shadow accounts (operation 428). The account balance is the remaining account balance after completion of the operations described in FIG. 4B, which includes executing the transfer-out transaction request on the account or the selected shadow account. The remaining account balance can be distributed from the account to the N shadow accounts based on the methods described in relation to FIG. 2 (i.e., based on a random distribution, an average distribution, or a predetermined rule). Finally, the system generates a record of the executed transaction based on the transfer-out transaction request and the selected shadow account (operation 430).

Figure 5A:
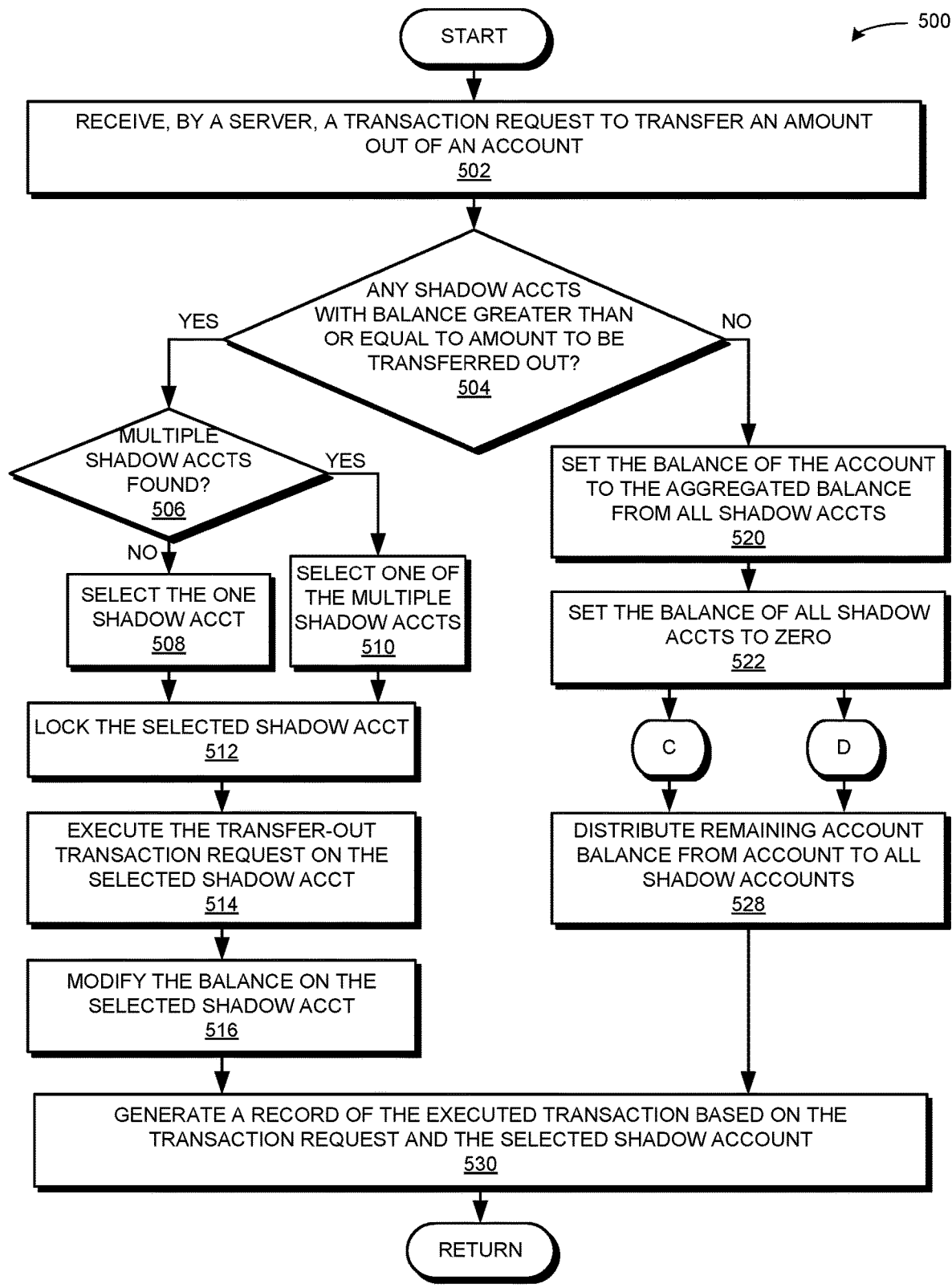
FIG. 5A presents a flowchart illustrating a method by a server for efficiently processing a request to transfer funds out of an account in a database, including traversal of the corresponding shadow accounts, in accordance with an embodiment of the present application.

Efficiently Processing a Request to Transfer Funds Out of an Account by Traversing Shadow Accounts FIG. 5A presents a flowchart 500 illustrating a method by a server for efficiently processing a request to transfer funds out of an account in a database, including traversal of the corresponding shadow accounts, in accordance with an embodiment of the present application. During operation, the system receives, by a server, a transaction request to transfer an amount out of an account ("transfer-out transaction request") (operation 502). The system determines whether there are any shadow accounts corresponding to the account with a balance greater than or equal to the amount to be transferred out (decision 504) (e.g., a "sufficiently funded shadow account"). The system can traverse the entire set of N shadow accounts to identify one or more sufficiently funded shadow accounts, or the system can traverse the set of N shadow accounts and stop traversing upon identifying one sufficiently funded shadow account. The system can traverse the set of N shadow accounts corresponding to the account based on any order or characteristic, such as by shadow account number, shadow account creation date, or shadow account modification date. If there are one or more sufficiently funded shadow accounts, the system determines whether there are multiple sufficiently funded shadow accounts (i.e., two or more sufficiently funded shadow accounts) (operation 506). If there are not (e.g., the system identifies only one sufficiently funded shadow account), the system selects that one shadow account (operation 508). If there are multiple shadow accounts (e.g., the system identifies two or more sufficiently funded shadow accounts), the system selects one of the multiple shadow accounts (operation 510). The system can perform this selection either randomly or based on a predetermined rule. For example, the system can select the shadow account with the greatest balance from the identified set of multiple shadow accounts.

Upon selecting the shadow account, the system locks the selected shadow account (operation 512), executes the transfer-out transaction request on the selected shadow account (operation 514), and modifies the balance on the selected shadow account by subtracting the amount from a current balance of the selected shadow account (operation 516). The system then generates a record of the executed transaction based on the transfer-out transaction request and the selected shadow account (operation 530).

If there is no shadow account with a balance greater than or equal to the amount to be transferred out (decision 504), the system sets the balance of the account to the aggregated balance from the N shadow accounts (operation 520), and sets the balance of each of the N shadow accounts to zero (operation 522). This is similar to operations 420 and 422 described in relation to FIG. 4A. At this point, the operation can continue as described at Label C or Label D of FIG. 5B.

Figure 5B:
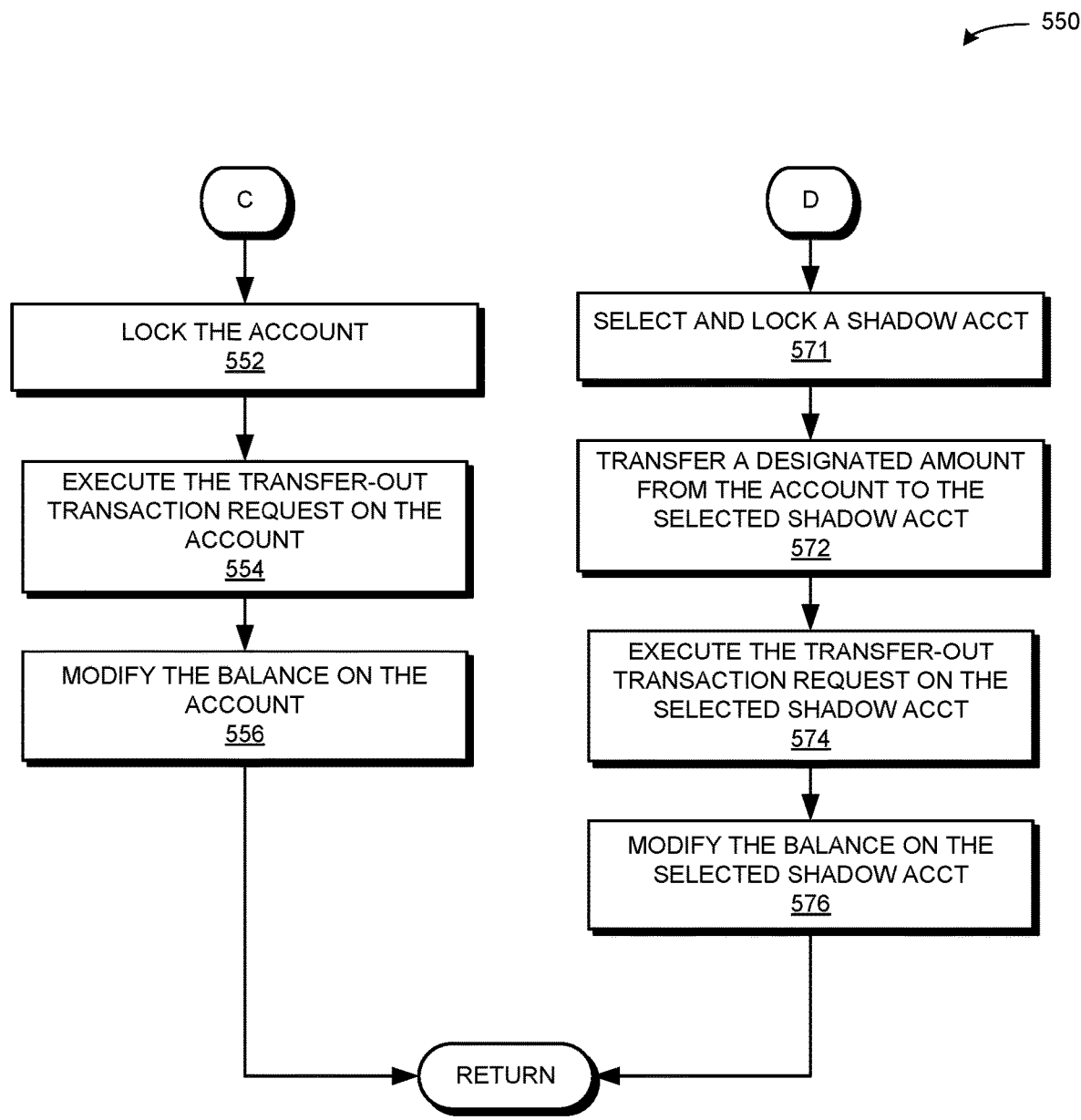
FIG. 5B presents a flowchart illustrating a method by a server for efficiently processing a request to transfer funds out of an account in a database, including traversal of the corresponding shadow accounts, in accordance with an embodiment of the present application.

FIG. 5B presents a flowchart 550 illustrating a method by a server for efficiently processing a request to transfer funds out of an account in a database, including traversal of a plurality of shadow accounts, in accordance with an embodiment of the present application. Label C depicts an operation performed on the account, while Label D depicts an operation performed on the selected shadow account. Under Label C, the system can lock the account (operation 552). The system can execute the transfer-out transaction request on the account (operation 554) and modify the balance on the account by subtracting the amount to be transferred out from the current balance of the account (operation 556). Note that while operations and functionality pertaining to a negative account balance are not depicted in FIG. 5B, the operations of FIG. 5B can include that functionality (e.g., as described in relation to operations 452, 454, and 456 of FIG. 4B).

Under Label D, the system can select and lock a shadow account (operation 571), which is similar to operations 404 and 406 described in relation to FIG. 4A. The system can transfer a designated amount from the account to the selected shadow account (operation 572). The designated amount can be of a value greater than or equal to the amount to be transferred out, and can be determined by the system based on a predetermined rule. The system can execute the transfer-out transaction request on the selected shadow account (operation 574) and modify the balance on the selected shadow account by subtracting the amount from a current balance of the selected shadow account (operation 516). The operation then continues as described in relation to FIG. 5A, at operation 528.

Upon completing the operations described above in relation to FIG. 5B, the system distributes the balance of the account (which is the remaining account balance after completion of the operations described in FIG. 5B, which includes executing the transfer-out transaction request) from the account to the N shadow accounts (operation 528). The remaining account balance can be distributed from the account to the N shadow accounts based on the methods described in relation to FIG. 2. Finally, the system generates a record of the executed transaction based on the transfer-out transaction request and the selected shadow account (operation 530).

Exemplary Apparatus and Computer System

Figure 6:
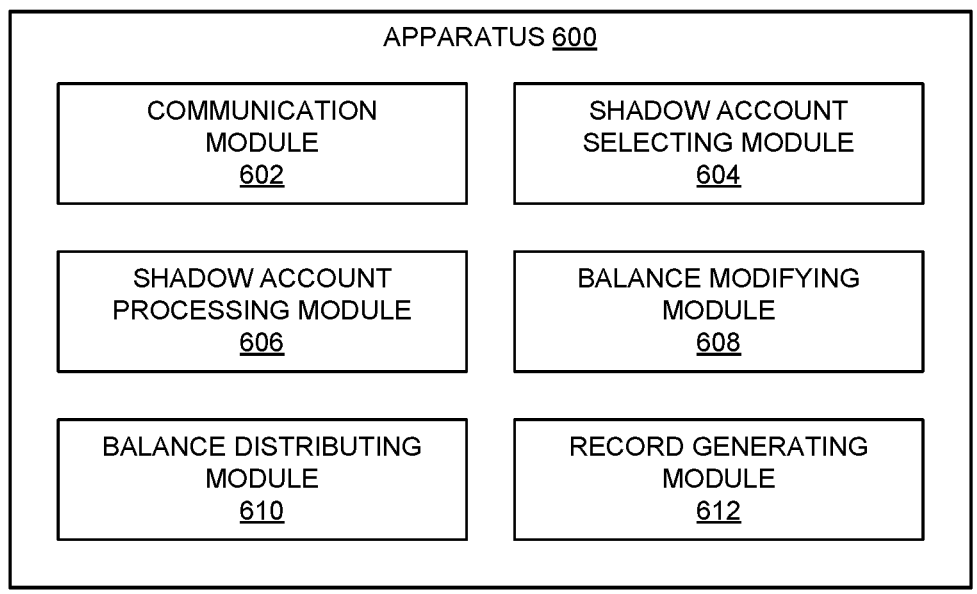
FIG. 6 illustrates an exemplary apparatus that facilitates efficient processing of requests related to an account in a database, in accordance with an embodiment of the present application.

FIG. 6 illustrates an exemplary apparatus 600 that facilitates efficient processing of requests related to an account in a database, in accordance with an embodiment of the present application. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, a shadow account selecting module 604, a shadow account processing module 606, a balance modifying module 608, a balance distributing module 610, and a record generating module 612.

In some embodiments, communication module 602 can send and/or receive data packets to/from other network nodes across a computer network, such as a content centric network, where a data packet can correspond to a request to transfer an amount in to or out of an account of a user. Shadow account selecting module 604 can select one of a plurality of shadow accounts that correspond to the account. Shadow account processing module 606 can lock and unlock the selected shadow account or the account. Balance modifying module 608 can modify the balance of a selected shadow account by adding the amount to be transferred in to or by subtracting the amount to be transferred out from a current balance of the selected shadow account. Record generating module 612 can generate a record that indicates the account, the selected shadow account, and the amount transferred in or out.

In response to determining that a balance of a selected shadow account is less than the amount to be transferred out, or in response to identifying no shadow accounts with a balance greater than or equal to the amount to be transferred out (shadow account processing module 606), balance modifying module 608 can also set a balance of the account to a combined balance of the shadow accounts, and can further set the balance of each shadow account to zero. Balance distributing module 610 can distribute a first amount equal to the balance of the account to the shadow accounts.

Balance modifying module 610 can further transfer a designated amount from the account to a selected shadow account, where the designated amount is of a value greater than or equal to an amount specified in the request. In response to determining that a balance of a selected shadow account is not less than the amount to be transferred out (shadow account processing module 606), balance modifying module 608 can modify the balance on the selected shadow account by subtracting the amount from a current balance of the selected shadow account.

In response to identifying one or more shadow accounts with a balance greater than or equal to the amount to be transferred out (shadow account processing module 606), various modules of apparatus 600 can perform the following functionality: shadow account selecting module 604 can select one of the identified shadow accounts; shadow account processing module 606 can lock the selected shadow account; and balance modifying module 608 can modify the balance on the selected shadow account by subtracting the amount from a current balance of the selected shadow account.

Figure 7:
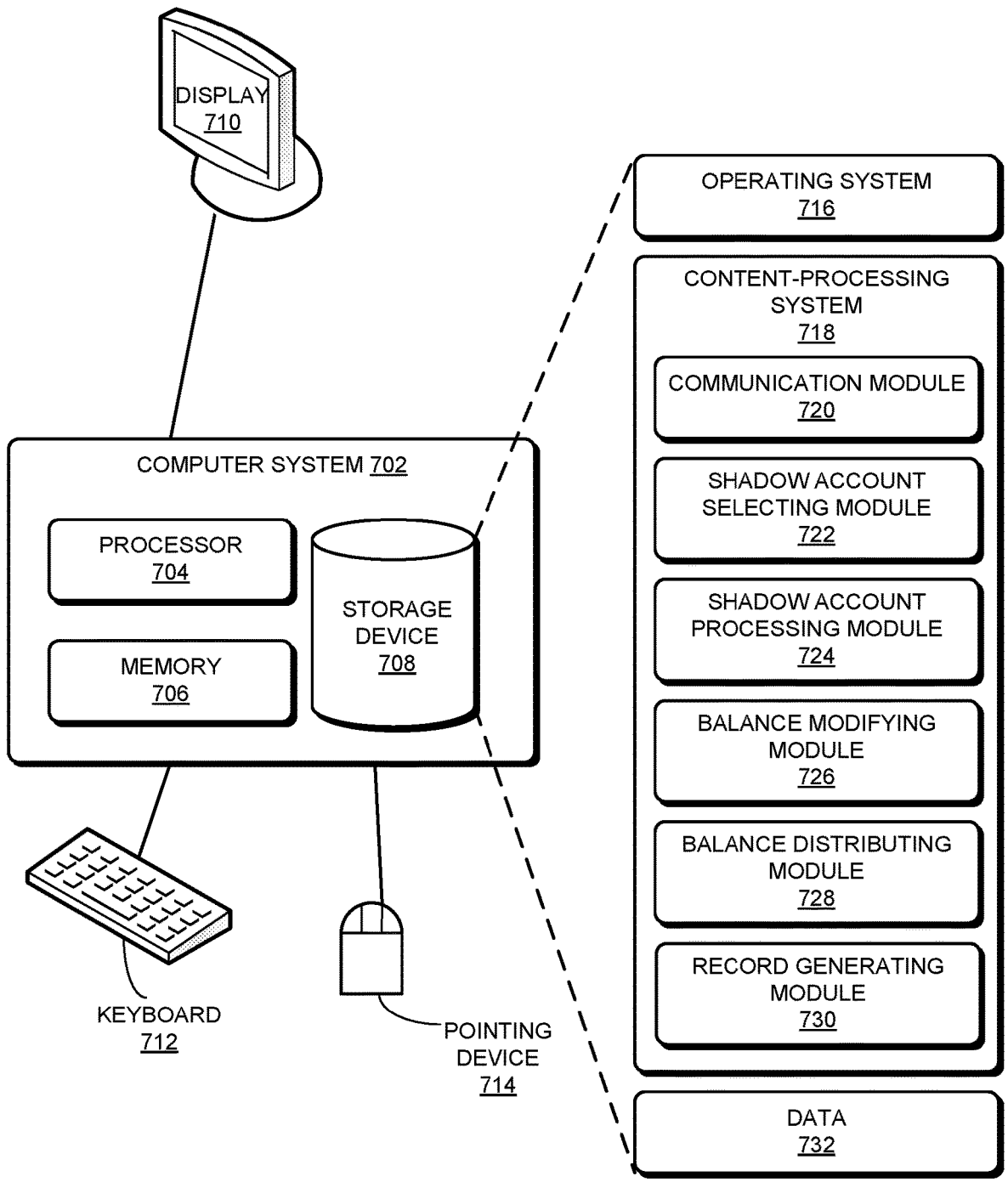
FIG. 7 illustrates an exemplary computer system that facilitates efficient processing of requests related to an account in a database, in accordance with an embodiment of the present application.

FIG. 7 illustrates an exemplary computer system that facilitates efficient processing of requests related to an account in a database, in accordance with an embodiment of the present application. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 730.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, such as a content centric network, where a data packet can correspond to a request to transfer an amount in to or out of an account of a user (communication module 720). Content-processing system 718 can include instructions for selecting one of a plurality of shadow accounts that correspond to the account (shadow account selecting module 722). Content-processing system 718 can also include instructions for locking and unlocking the selected shadow account or the account (shadow account processing module 724). Content-processing system 718 can include instructions for modifying the balance of a selected shadow account by adding the amount to be transferred in to or by subtracting the amount to be transferred out from a current balance of the selected shadow account (balance modifying module 726). Content-processing system 718 can further include instructions for generating a record that indicates the account, the selected shadow account, and the amount transferred in or out (record generating module 730).

Content-processing system 718 can additionally include instructions for, in response to determining that a balance of a selected shadow account is less than the amount to be transferred out (shadow account processing module 724), or in response to identifying no shadow accounts with a balance greater than or equal to the amount to be transferred out (shadow account processing module 724), setting a balance of the account to a combined balance of the shadow accounts, and setting the balance of each shadow account to zero (balance modifying module 726). Content-processing system 718 can include instructions for distributing a first amount equal to the balance of the account to the shadow accounts (balance distributing module 728).

Content-processing system 718 can also include instructions for transferring a designated amount from the account to a selected shadow account, where the designated amount is of a value greater than or equal to an amount specified in the request (balance modifying module 726). Content-processing system 718 can include instructions for, in response to determining that a balance of a selected shadow account is not less than the amount to be transferred out (shadow managing processing module 724), modifying the balance on the selected shadow account by subtracting the amount from a current balance of the selected shadow account (balance modifying module 726).

Content-processing system 718 can further include instructions for, in response to identifying one or more shadow accounts with a balance greater than or equal to the amount to be transferred out (shadow account processing module 724): selecting one of the identified shadow accounts (shadow account selecting module 722); locking the selected shadow account (shadow account processing module 724); and modifying the balance on the selected shadow account by subtracting the amount from a current balance of the selected shadow account (balance modifying module 728).

Data 732 can include any data that is required as input or that is generated as output by the methods and/or processes described in this disclosure. Specifically, data 732 can store at least: a packet or message that corresponds to a request to transfer an amount in to or out of an account; an amount to transfer in or out; a designated amount which is greater than or equal to the amount; an account of a user; a plurality of shadow accounts that correspond to the account and are not visible to the user; a record of a request that indicates the account, a selected shadow account and/or the amount; a balance for the account; a balance for each shadow account; an account creation date; an account modification date; a shadow flag that indicates whether an account is a shadow account or not; a method for distributing funds from the account to the shadow accounts, where the method can be based on one or more of a random distribution, an average distribution, or another predetermined rule for distribution;

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for efficiently processing requests related to a database, the system comprising:
   a processor; and
   a memory coupled to the processor and storing instructions, which when executed by the processor causes the processor to perform a method, the method comprising:
     determining, by a server, a number of shadow accounts in a plurality of shadow accounts, wherein the plurality of shadow accounts correspond to an account of a user, wherein the number is greater than one and is determined based on an amount of time spent to complete a transaction request on the account of the user, wherein the user account is visible to the user and corresponds to a record in a database, and wherein each shadow account from the plurality of shadow accounts is not visible to the user;
     creating the plurality of shadow accounts having the determined number of shadow accounts;
     distributing, by the server, an entirety of a balance of the user account to the created plurality of shadow accounts;
     receiving, by the server, a request to transfer a first amount into the user account;
     selecting one shadow account from the plurality of shadow accounts that correspond to the user account;
     locking the selected shadow account, which prevents any concurrent database record changes to be made to a corresponding record for the selected shadow account in the database; and modifying a balance of the selected shadow account by adding the first amount to a current balance of the selected shadow account, whereby the system continues to process requests related to the user account based on a remainder of the shadow accounts that correspond to the user account.

2. The computer system of claim 1, wherein the database includes a mapping between the user account and the corresponding shadow accounts.

3. The computer system of claim 1, wherein the method further comprises:

generating a record of the request that indicates the user account, the selected shadow account, and the first amount.

4. The computer system of claim 1, wherein the method further comprises:

unlocking the selected shadow account.

5. A computer system for efficiently processing requests related to a database, the system comprising:

a processor; and a memory coupled to the processor and storing instructions, which when executed by the processor causes the processor to perform a method, the method comprising:

determining, by a server, a number of shadow accounts in a plurality of shadow accounts, wherein the plurality of shadow accounts correspond to an account of a user, wherein the number is greater than one and is determined based on an amount of time spent to complete a transaction request on the account of the user, wherein the user account is visible to the user and corresponds to a record in a database, and wherein each shadow account from the plurality of shadow accounts is not visible to the user;

creating the plurality of shadow accounts having the determined number of shadow accounts;

distributing, by the server, an entirety of a balance of the user account to the created plurality of shadow accounts;

receiving, by the server, a request to transfer a first amount out of the user account;

selecting one shadow account from the plurality of shadow accounts that correspond to the user account;

locking the selected shadow account, which prevents any concurrent database record changes to be made to a corresponding record for the selected shadow account in the database; and in response to determining that a balance of the selected shadow account is less than the first amount:

setting a balance of the user account to a first combined balance of the shadow accounts;

setting a balance of each shadow account to zero;

executing the request by one of:

in response to determining that a negative balance is allowed on the user account or that the first combined balance is greater than the first amount, executing the request on the user account; and prior to executing the request on the selected shadow account, transferring a second amount from the user account to the selected shadow account; and distributing a third amount equal to an entirety of the balance of the user account from the user account to the shadow accounts, whereby the system continues to process requests related to the user account based on a remainder of the shadow accounts that correspond to the user account.

6. The computer system of claim 5, wherein the database includes a mapping between the user account and the corresponding shadow accounts.

7. The computer system of claim 5, wherein executing the request on the user account further comprises:

unlocking the selected shadow account;

locking the user account; and modifying the balance on the user account by subtracting the first amount from a current balance of the user account.

8. The computer system of claim 5, wherein executing the request on the selected shadow account further comprises:

wherein the second amount is of a value greater than or equal to the first amount, modifying the balance on the selected shadow account by subtracting the first amount from a current balance of the selected shadow account.

9. The computer system of claim 5, wherein the method further comprises:

generating a record of the request that indicates the user account, the selected shadow account, and the first amount.

10. The computer system of claim 5, wherein in response to determining that a balance of the selected shadow account is not less than the first amount, the method further comprises:

modifying the balance on the selected shadow account by subtracting the first amount from a current balance of the selected shadow account.

11. The computer system of claim 5, wherein distributing the third amount or the entirety of the balance of the user account is based on one or more of:

a random distribution of the third amount or the entirety of the balance of the user account from the user account to the shadow accounts;

an equal distribution of the third amount or the entirety of the balance of the user account from the user account to the shadow accounts, wherein an amount distributed into each of the shadow accounts is based on an average of the third amount or the entirety of the balance of the user account divided by the determined number of shadow accounts; and a predetermined rule for distributing the third amount or the entirety of the balance of the user account from the user account to the shadow accounts.

12. The computer system of claim 5, wherein the database includes one or more of:

an account number that corresponds to the user account;

a balance that indicates a current balance of the user account;

an account creation time that indicates when the user account was created;

an account modification time that indicates when the user account was last modified; and a flag that indicates if a given account is a shadow account.

13. A computer system for efficiently processing requests related to a database, the system comprising:

a processor; and a memory coupled to the processor and storing instructions, which when executed by the processor causes the processor to perform a method, the method comprising:

determining, by a server, a number of shadow accounts in a plurality of shadow accounts, wherein the plurality of shadow accounts correspond to an account of a user, wherein the number is greater than one and is determined based on an amount of time spent to complete a transaction request on the account of the user, wherein the user account is visible to the user and corresponds to a record in a database, and wherein each shadow account from the plurality of shadow accounts is not visible to the user;

creating the plurality of shadow accounts having the determined number of shadow accounts;

distributing, by the server, an entirety of a balance of the user account to the created plurality of shadow accounts;

receiving, by the server, a request to transfer a first amount out of the user account;

selecting one shadow account from the plurality of shadow accounts that correspond to the user account;

locking the selected shadow account, which prevents any concurrent database record changes to be made to a corresponding record for the selected shadow account in the database; and in response to identifying no shadow accounts with a balance greater than or equal to the first amount:
  setting a balance of the user account to a first combined balance of the shadow accounts;
  setting a balance of each shadow account to zero;
  executing the request by one of:
    in response to determining that a negative balance is allowed on the user account or that the first combined balance is greater than the first amount, executing the request on the user account; and
    prior to executing the request on the selected shadow account, transferring a second amount from the user account to the selected shadow account; and
  distributing a third amount equal to an entirety of the balance of the user account from the user account to the created plurality of shadow accounts,
  whereby the system continues to process requests related to the user account based on a remainder of the plurality of shadow accounts that correspond to the user account.

14. The computer system of claim 13, wherein the database includes a mapping between the user account and the corresponding shadow accounts.

15. The computer system of claim 13, wherein executing the request on the user account further comprises:
  locking the user account; and
  modifying the balance on the user account by subtracting the first amount from a current balance of the user account.

16. The computer system of claim 13, wherein executing the request on the selected shadow account further comprises:
  selecting the shadow account to which the second amount is transferred, wherein the second amount is of a value greater than or equal to the first amount; and
  modifying the balance on the selected shadow account by subtracting the first amount from a current balance of the selected shadow account.

17. The computer system of claim 13, wherein the method further comprises:
  generating a record of the request that indicates one or more of the user account, the selected shadow account, and the first amount.

18. The computer system of claim 13, wherein in response to identifying one or more shadow accounts with a balance greater than or equal to the first amount:
  selecting one of the identified shadow accounts;
  locking the selected shadow account, which prevents any concurrent database record changes to be made to the corresponding record in the database; and
  modifying the balance on the selected shadow account by subtracting the first amount from a current balance of the selected shadow account.

19. The computer system of claim 13, wherein distributing the third amount or the entirety of the balance of the user account is based on one or more of:
  a random distribution of the third amount or the entirety of the balance of the user account from the user account to the shadow accounts;
  an equal distribution of the third amount or the entirety of the balance of the user account from the user account to the shadow accounts, wherein an amount distributed into each of the shadow accounts is based on an average of the third amount or the entirety of the balance of the user account divided by the determined number of shadow accounts; and
  a predetermined rule for distributing the third amount or the entirety of the balance of the user account from the user account to the shadow accounts.

20. The computer system of claim 13, wherein the database includes one or more of:
  an account number that corresponds to the user account;
  a balance that indicates a current balance of the user account;
  an account creation time that indicates when the user account was created;
  an account modification time that indicates when the user account was last modified; and
  a flag that indicates if a given account is a shadow account.

21. A computer-implemented method for efficiently processing requests related to a database, the method comprising:
  determining, by a server, a number of shadow accounts in a plurality of shadow accounts, wherein the plurality of shadow accounts correspond to an account of a user, wherein the number is greater than one and is determined based on an amount of time spent to complete a transaction request on the account of the user, wherein the user account is visible to the user and corresponds to a record in a database, and wherein each shadow account from the plurality of shadow accounts is not visible to the user;
  creating the plurality of shadow accounts having the determined number of shadow accounts;
  distributing, by the server, an entirety of a balance of the user account to the created plurality of shadow accounts;
  receiving, by the server, a request to transfer a first amount into the user account;
  selecting one shadow account from the plurality of shadow accounts that correspond to the user account;

locking the selected shadow account, which prevents any concurrent database record changes to be made to a corresponding record for the selected shadow account in the database;

modifying a balance of the selected shadow account by adding the first amount to a current balance of the selected shadow account, whereby the server continues to process requests related to the user account based on a remainder of the shadow accounts that correspond to the user account.

22. A computer-implemented method for efficiently processing requests related to a database, the method comprising:

determining, by a server, a number of shadow accounts in a plurality of shadow accounts, wherein the plurality of shadow accounts correspond to an account of a user, wherein the number is greater than one and is determined based on an amount of time spent to complete a transaction request on the account of the user, wherein the user account is visible to the user and corresponds to a record in a database, and wherein each shadow account from the plurality of shadow accounts is not visible to the user;

creating the plurality of shadow accounts having the determined number of shadow accounts;

distributing, by the server, an entirety of a balance of the user account to the created plurality of shadow accounts;

receiving, by the server, a request to transfer a first amount out of the user account;

selecting one shadow account from the plurality of shadow accounts that correspond to the user account;

locking the selected shadow account, which prevents any concurrent database changes to be made to a corresponding record for the selected shadow account in the database; and in response to determining that a balance of the selected shadow account is less than the first amount:
setting a balance of the user account to a first combined balance of the shadow accounts;
setting a balance of each shadow account to zero;
executing the request by one of:
in response to determining that a negative balance is allowed on the user account or that the first combined balance is greater than the first amount, executing the request on the user account; and
prior to executing the request on the selected shadow account, transferring a second amount from the user account to the selected shadow account; and
distributing a third amount equal to an entirety of the balance of the user account from the user account to the shadow accounts,
whereby the server continues to process requests related to the user account based on a remainder of the shadow accounts that correspond to the user account.

23. The method of claim 22, wherein executing the request on the user account further comprises:
unlocking the selected shadow account;
locking the user account; and
modifying the balance on the user account by subtracting the first amount from a current balance of the user account.

24. The method of claim 22, wherein executing the request on the selected shadow account further comprises:
wherein the second amount is of a value greater than or equal to the first amount,
modifying the balance on the selected shadow account by subtracting the first amount from a current balance of the selected shadow account.

25. A computer-implemented method for efficiently processing requests related to a database, the method comprising:

determining, by a server, a number of shadow accounts in a plurality of shadow accounts, wherein the plurality of shadow accounts correspond to an account of a user, wherein the number is greater than one and is determined based on an amount of time spent to complete a transaction request on the account of the user, wherein the user account is visible to the user and corresponds to a record in a database, and wherein each shadow account from the plurality of shadow accounts is not visible to the user;

creating the plurality of shadow accounts having the determined number of shadow accounts;

distributing, by the server, an entirety of a balance of the user account to the created plurality of shadow accounts;

receiving, by the server, a request to transfer a first amount out of the user account;

selecting one shadow account from the plurality of shadow accounts that correspond to the user account;

locking the selected shadow account, which prevents any concurrent database record changes to be made to a corresponding record for the selected shadow account in the database; and in response to identifying no shadow accounts with a balance greater than or equal to the first amount:
setting a balance of the user account to a first combined balance of the shadow accounts;
setting a balance of each shadow account to zero;
executing the request by one of:
in response to determining that a negative balance is allowed on the user account or that the first combined balance is greater than the first amount, executing the request on the user account; and
prior to executing the request on the selected shadow account, transferring a second amount from the user account to the selected shadow account; and
distributing a third amount equal to an entirety of the balance of the user account from the user account to the created plurality of shadow accounts,
whereby the server continues to process requests related to the user account based on a remainder of the shadow accounts that correspond to the user account.

26. The method of claim 25, wherein executing the request on the user account further comprises:
locking the user account; and
modifying the balance on the user account by subtracting the first amount from a current balance of the user account.

27. The method of claim 25, wherein executing the request on the selected shadow account further comprises:
selecting the shadow account to which the second amount is transferred;
wherein the second amount is of a value greater than or equal to the first amount; and
modifying the balance on the selected shadow account by subtracting the first amount from a current balance of the selected shadow account.

28. The method of claim 25, wherein in response to identifying one or more shadow accounts with a balance greater than or equal to the first amount:
- selecting one of the identified shadow accounts;
- locking the selected shadow account, which prevents any concurrent database record changes to be made to the corresponding record in the database; and
- modifying the balance on the selected shadow account by subtracting the first amount from a current balance of the selected shadow account.

* * * * *